United States Patent [19]

Graham

[11] Patent Number: 4,666,595

[45] Date of Patent: May 19, 1987

[54] APPARATUS FOR ACOUSTICALLY REMOVING PARTICLES FROM A MAGNETIC SEPARATION MATRIX

[75] Inventor: Marshall D. Graham, Framingham, Mass.

[73] Assignee: Coulter Electronics, Inc., Hialeah, Fla.

[21] Appl. No.: 776,699

[22] Filed: Sep. 16, 1985

[51] Int. Cl.[4] .......................... B01D 35/06; B03C 1/02

[52] U.S. Cl. ...................................... 210/222; 55/100; 210/239; 210/408; 210/409; 210/748; 210/927

[58] Field of Search ............... 210/222, 223, 407, 408, 210/409, 695, 748, 927, 239; 252/62.9; 55/100; 435/2

[56] References Cited

U.S. PATENT DOCUMENTS

| | | | |
|---|---|---|---|
| 2,329,893 | 9/1943 | Girard | 210/222 |
| 2,735,550 | 2/1956 | Fagerberg | 210/223 |
| 3,578,072 | 5/1971 | Kolm | 165/84 |
| 3,676,337 | 7/1972 | Kolm | 210/695 |
| 3,703,958 | 11/1972 | Kolm | 210/695 |
| 3,822,016 | 7/1974 | Jones | 209/222 |
| 3,838,773 | 10/1974 | Kolm | 209/10 |
| 3,869,390 | 3/1975 | Heitmann et al. | 210/222 |
| 3,873,448 | 3/1975 | Isberg et al. | 210/222 |
| 3,887,457 | 6/1975 | Marston et al. | 209/214 |
| 3,890,241 | 6/1975 | Nishida et al. | 252/62.9 |
| 3,947,349 | 3/1976 | Fritz | 209/214 |
| 3,970,518 | 7/1976 | Giaever | 435/239 |
| 3,988,240 | 10/1976 | Fraas | 209/214 |
| 4,018,886 | 4/1977 | Giaever | 436/526 |
| 4,054,513 | 10/1977 | Windle | 210/222 X |
| 4,087,358 | 5/1978 | Oder | 210/425 |
| 4,116,829 | 9/1978 | Clark et al. | 210/222 X |
| 4,141,687 | 2/1979 | Forrest et al. | 436/526 |
| 4,147,632 | 4/1979 | Oder | 210/222 |
| 4,190,524 | 2/1980 | Watson | 210/222 |
| 4,217,213 | 8/1980 | Schuster | 210/695 |
| 4,230,685 | 10/1980 | Senyei et al. | 436/526 |
| 4,244,822 | 1/1981 | Slavens | 210/222 |
| 4,375,407 | 3/1983 | Kronick | 209/8 |
| 4,544,482 | 10/1985 | Rupp | 210/222 |

FOREIGN PATENT DOCUMENTS

| | | | |
|---|---|---|---|
| 119475 | 10/1978 | Japan | 210/695 |
| 58946 | 5/1979 | Japan | 210/222 |
| 1578396 | 11/1980 | United Kingdom | 210/222 |

OTHER PUBLICATIONS

"Cleaning of MGMF Matrices", Boucher and Bulmer, vol. Mag. 18, No. 6, Nov. 1982, pp. 1665-1667, IEEE Transactions of Magnetics.

"Impulse Response of Water-Loaded-Air-Backed Piezoelectric Disks", Pace, IEEE Transactions on Sonics and Ultrasonics, vol. SU-26, No. 1, Jan. 1979, pp. 37-41.

"Pulsed Operation of a Flat Piezoelectric Transducer", Gitis and Shenker, Sov. Phys. Acoust. 27(6), Nov.-Dec. 1981, pp. 469-472.

*Primary Examiner*—Richard V. Fisher
*Assistant Examiner*—W. Gary Jones
*Attorney, Agent, or Firm*—Lahive & Cockfield

[57] ABSTRACT

An apparatus for dislodging fragile particles, such as intact biological cells, retained by the separation matrix in a flow chamber of a magnetic separation system. The apparatus incorporates a piezoelectric transducer which is coupled to the matrix and an associated drive circuit. The system can operate in a capture phase, whereby fragile particles are selectively captured from a carrier fluid passing through the matrix, with those captured particles being magnetically held in place within the matrix. In the elutriation phase, an elutriation fluid is passed through the matrix and the drive circuit excites the piezoelectric transducer. In response to the excitation, the transducer establishes acoustic waves in the elutriation fluid passing through the matrix, vibrating the matrix itself. Depending upon the mechanical impedances within the flow chamber, the acoustic waves can be ultrasonic. The acoustic waves and matrix vibration operate to dislodge the intact cells from the matrix, even at relatively low elutriation flow rates.

13 Claims, 4 Drawing Figures

APPARATUS FOR ACOUSTICALLY REMOVING PARTICLES FROM A MAGNETIC SEPARATION MATRIX

REFERENCE TO RELATED APPLICATION

The subject matter of this application is related to the subject matter of U.S. patent application Ser. No. 776,567, entitled "Flux Diverting Flow Chamber for High Gradient Magnetic Separation of Particles From a Liquid Medium", filed on even date herewith. That application is incorporated herein by reference.

BACKGROUND OF THE DISCLOSURE

The present invention is in the field of instrumentation and more particularly relates to apparatus for magnetically separating particles from a liquid medium.

The magnetic separation of solid material from a fluid medium has been accomplished in the prior art for processes where there was no concern for the integrity of the separated material. By way of example, processes are well known for separation of iron oxides from a mineral slurry. In practice, these separation processes lead to harsh physical interaction among the separated particles as well as between the separated particles and the separation matrix. Generally, there is no need in such fields of magnetic separation to be concerned about the intactness of the separated particles, although there is often concern with maintaining the integrity of the matrix.

In other applications of magnetic separation, there is a concern about integrity of separated particles. For example, there is the need to separate intact living, biological cells from a fluid carrier, so that those cells may be analyzed. As another example, a fragilely connected aggregate of particles may be considered as a "particle" for which separation from a carrier fluid is desired while maintaining the aggregate relationship. One known separation technique useful in these fields is high-gradient magnetic separation, HGMS.

In prior art HGMS systems, the collection of particles occurs on a matrix of magnetic wires, fibers, spheres or other high permeability members situated in a magnetic flux. Generally, such matrices are characterized by interstitial spaces through which the particles and carrier fluid may pass. As the particles pass through the matrix, each particle experiences a magnetic force toward the matrix elements proportional to $$(\psi_p - \psi_f)\, V_p\, H\, dH/dx,$$

where $\psi_p$ is the susceptibility of the particle, $\psi_f$ is the susceptibility of the carrier fluid, $V_p$ is the volume of the particle, H is the magnetic field intensity and x is a spatial dimension away from the matrix surface. In a paramagnetic mode of operation, where $\psi_p$ exceeds $\psi_f$, that is where the particles are more "magnetic" than the carrier fluid, the particles are attracted to the elements of the matrix in the "strong field" regions at those elements. In a diamagnetic mode of operation, where $\psi_f$ exceeds $\psi_p$, that is, where the carrier fluid is more "magnetic" than the particles, the particles are repelled from the strong field regions, but may be attracted to the weak or low field regions, at the matrix elements.

In a capture phase of operation, a fluid carrying the particles-to-be-separated is passed through the matrix at flow rates sufficiently low that magnetic attractive forces on the particles in the matrix exceed viscous and gravitational forces. As a consequence, those particles are held, or captured, against portions of the matrix while the carrier fluid exits the matrix. An elutriation phase may then be initiated to retrieve the captured particles from the matrix, for example, for subsequent analysis.

In HGMS systems where the magnetic flux is generated by an electromagnet, or by a permanent magnet whose flux is by some means removed from the matrix during the elutriation phase, particles can be released from the matrix following their collection from the particle-laden carrier by first interrupting drive current to the winding of the electromagnet, or removing the permanent magnet flux from the matrix. However, residual magnetism in the system may cause some particles to be held by the matrix. Then the velocity at which the elutriation fluid is driven through the matrix may be selectively increased to remove the non-released particles from the matrix.

In HGMS systems where the magnetic flux is generated by permanent magnets, and the matrix is maintained within the magnetic flux path at all times, that flux may continue to cause retention of the captured particles even upon the introduction of an elutriation fluid. The common method for elutriating the captured particles in this case is to appreciably increase fluid flow rates, so that the viscous drag forces exceed the magnetic retention forces; the captured particles are thus flushed off the matrix. This latter approach has been widely used with inorganic particles, but has been less successful when applied to separation of fragile particles such as intact living biological cells. Cellular debris observed in the flush effluent, particularly when old bloods are subjected to this method of cell elutriation, demonstrate that the method is too harsh for use with many clinical specimens.

It is an object of the present invention to provide an improved apparatus for magnetically removing particles from a fluid medium.

Another object is to provide an improved apparatus for magnetically capturing, and providing the intact removal therefrom of, fragile particles in a fluid medium.

Yet another object is to provide an improved apparatus for magnetically capturing, and providing the removal therefrom of, intact biological cells from a fluid medium.

SUMMARY OF THE INVENTION

This invention is directed to an apparatus for dislodging fragile particles, such as intact biological cells, retained by the separation matrix in a flow chamber of a high gradient magnetic separation (HGMS) system. The apparatus incorporates a piezoelectric transducer, which is acoustically coupled to the matrix, and an associated drive circuit. By way of example, the piezoelectric transducer may be affixed to a wall of the chamber housing the matrix with the transducer being in fluid or mechanical communication with the matrix. Alternatively, the piezoelectric transducer may be mechanically coupled to the matrix.

The HGMS system may operate in a conventional manner in the capture phase, whereby fragile particles are selectively captured from a carrier fluid passing through the matrix, with those captured particles being magnetically held in place on the matrix. In the elutriation phase, an elutriation fluid is passed through the matrix and the drive circuit excites the piezoelectric transducer. In response to the excitation, the transducer establishes acoustic waves in the elutriation fluid passing through the matrix, vibrating the matrix itself. Depending upon the mechanical impedances with the flow chamber, the acoustic waves may be ultrasonic. The acoustic waves and matrix vibration operate to dislodge the intact cells from the matrix, even at relatively low elutriation flow rates as compared with conventional practice.

BRIEF DESCRIPTION OF THE DRAWINGS

The foregoing and other objects of this invention, the various features thereof, as well as the invention itself, may be more fully understood from the following description when read together with the accompanying drawings in which.

DESCRIPTION OF THE PREFERRED EMBODIMENT

Figure 1:
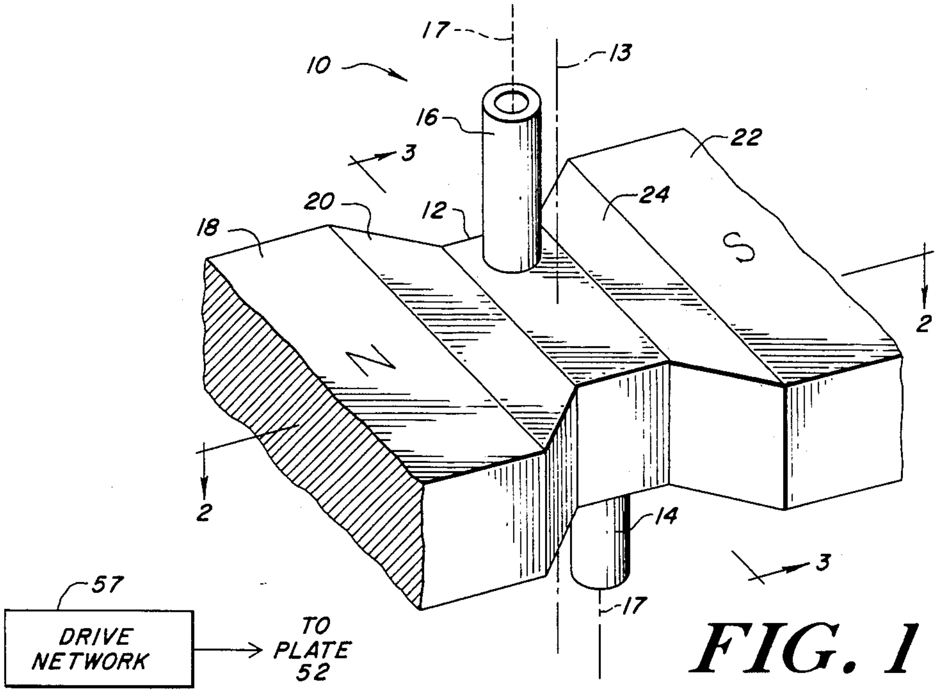
FIG. 1 shows a perspective view of a separator constructed in accordance with the present invention.
Figure 2:
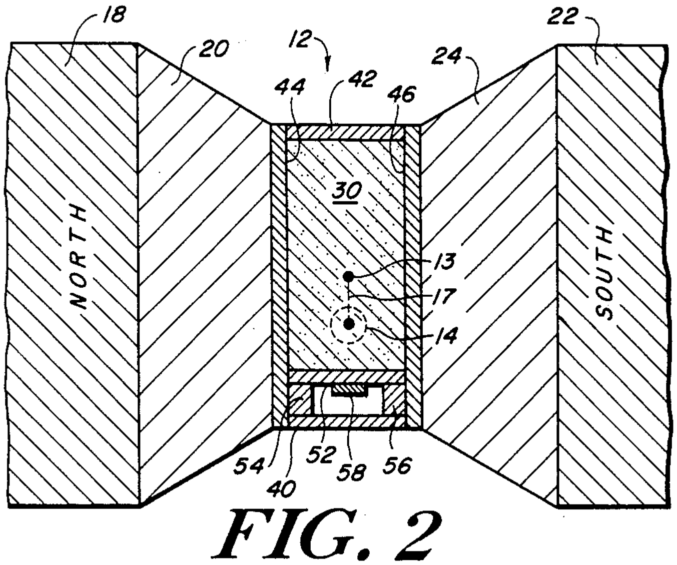
FIG. 2 shows a sectional view of the separator of FIG. 1 along the line 2—2.
Figure 3:
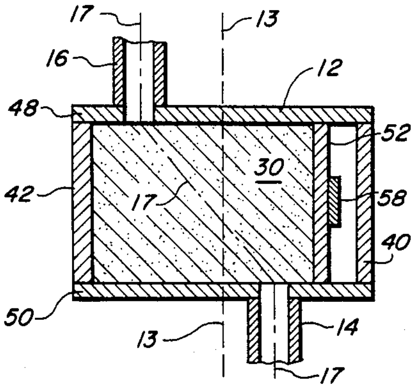
FIG. 3 shows a sectional view of the separator flow chamber of FIG. 1 along the line 3—3.

FIGS. 1-3 show a high-gradient magnetic separator 10. A magnetizing means is selectively operative, whereby in a first state a relatively high level of magnetic flux is coupled to a matrix, and in a second state a relatively low level of flux is coupled to the matrix. The separator 10 of the present embodiment is disclosed with a permanent magnet for generating the magnetic field used in particle separation. The invention also is applicable to an electromagnet-based HGMS system, where the separation magnetic field is generated with an electromagnet and the removal of captured particles can be achieved either with the magnet energized or de-energized.

The separator 10 includes a flow chamber 12 positioned along a local vertical axis 13. The flow chamber 12 has an input port 14 and an output port 16. The chamber 12 is adapted to permit fluid flow from the port 14 to the port 16 generally along the flow axis 17. A permanent magnet assembly is exterior to the chamber 12. The magnet assembly includes a "North" pole 18, an associated high permeability field-converging pole piece 20, a "South" pole 22 and an associated high permeability field-converging pole piece 24. The pole pieces 20 and 24, together with the flow chamber 12, establish a flux path between the poles 18 and 22. For permanent magnet embodiments, the poles 18 and 22 can be provided by a single horseshoe magnet. For electromagnet embodiments, conventional type electromagnetics or superconducting solenoids and energizing circuits, not shown, can be used.

A high permeability, interstitial matrix 30 is positioned along the axis 17 within the flow chamber 12 in a manner such that fluid driven between ports 14 and 16 passes substantially through the matrix 30. Although during operation, fluid generally flows throughout the matrix 30 in various directions, the flow axis 17 between the ports 14 and 16 represents the nominal axis of flow within the matrix 30. In other embodiments, there can be additional input ports and/or output ports so that different fluid flow paths can be established during the capture and elutriation phases. In the present embodiment, the flow through chamber 12 has a direction component opposite to the local gravitational field. As a result, the gravitational field assists the separation process by causing a relative slowing of the particle flow in the carrier fluid.

In the illustrated embodiment, the chamber 12 has a rectangular cross section, with sidewalls 40 and 42 being non-magnetic, (i.e. having low magnetic permeability), sidewalls 44 and 46 being magnetic, and top and bottom walls 48 and 50 being non-magnetic. In alternative forms, the sidewalls 44 and 46 also can be non-magnetic, particularly if of sufficient thinness that matrix magnetization remains acceptable.

A piezoelectric plate 52, described below, and the walls 40, 42, 44, 46, 48 and 50 define a rectangular cross-sectional region interior to the chamber 12. This interior region houses the matrix 30. As shown, this interior region has a rectangular cross-section along the nominal flow axis 17 as well as transverse to that axis. In alternative embodiments, different cross-sectional shapes for the interior region might be used to permit improved fluid flow characteristics. For example, the illustrated embodiment might be modified so that the downstream end of the interior region is hemispherical in shape.

The matrix 30 is a high permeability assembly constructed of magnetic wires, fibers, spheres, or the like, in a conventional fashion, having interstices large enough to permit the carrier fluid and particles to flow therethrough. The matrix 30 forms a part of the flux path between the pole pieces 20 and 24. By way of example, the matrix elements can comprise 5-15% of the chamber's interior volume. In the embodiment shown in FIGS. 1-3, within the matrix 30, the flow axis 17 is offset with respect to the local vertical axis 13. In various embodiments, the axis 17 can be offset from the local vertical by any angle between and including zero and ninety degrees. Optimally, the offset of the axis 17 is substantially equal to forty-five degrees, although other orientations can be used.

Also within the chamber 12 is a piezoelectric plate 52. In the illustrated embodiment, by way of example, the plate 52 is positioned by supporting members 54 and 56, forming a secondary sidewall for the chamber 12 as shown in FIG. 2. Alternatively, the plate 52 can be integral with the interior surface of the wall 40, or one of the sidewalls 44 or 46.

The plate 52 is coupled to a drive network 57. A back-loading element 58 can be used for quarter-wave impedance matching of the chamber contents to the piezoelectric plate 52. In the illustrated embodiment, the plate 52 is in mechanical contact with the the matrix 30. In other forms of the invention, the plate 52 can be spaced apart from, but in fluidic communication with the matrix 30. The plate 52 can be exposed to the fluid containing the particles to be separated, or isolated from it by a thin membrane, insulating film or the like.

The preferred embodiment is particularly adapted to remove intact biological cells (such as erythrocytes) from a fluid medium (such as whole blood). In this embodiment, a fluid driver or pump (not illustrated) is adapted to drive the fluid medium through the chamber 12 in the capture phase of operation. During this capture phase, the plate 52 is passive, and the magnetic field passes through the matrix 30. The cells passing in close proximity to the matrix elements are attracted and captured or held by those elements due to the forces generated on these particles by the magnetic field, as in conventional HGMS system operation.

As the matrix 30 loading capacity is approached, an elutriation fluid can be substituted for the feed fluid and the elutriation phase begun. During this phase, the drive network 57 drives the plate 52 to generate a high frequency, e.g. 15 KHz, acoustic wave through the fluid in chamber 12. The drive waveform generated by network 57 can be a periodic oscillation gated off after the captured particles are elutriated, a single or repeated pulse as from an energy storage circuit, or other suitable waveform. Regardless of the specific drive chosen, acoustic waves set up by the plate in response to the drive dislodge the particles from the matrix, either by driving the matrix 30 mechanically or by the action of the acoustic waves propagating through the chamber volume. As a result, the captured particles can be elutriated with lower flow rates than in conventional HGMS practice. The reduction in flow rates during elutriation depends on the strength of the acoustic wave and is more effective with the back-loading element 58 on the outer surface of the plate 52.

Thus, during the capture phase, feed fluid carrying the particles-to-be-separated is driven through the matrix 30. As the matrix 30 loading capacity is approached, an elutriation fluid can be substituted for the feed fluid and the elutriation phase begun. During that phase, the network 57 drives the plate 52, establishing an acoustic wave interaction between the medium and the cell-laden matrix 30, releasing the captured particles. The released particles are then swept out of the matrix 30 by the elutriation fluid. In contrast to conventional HGMS practice, the elutriation fluid flow rate can be relatively low, permitting elutriation of intact biological cells.

With the described configuration, the matrix-collision forces are substantially reduced, and thereby cell fragmentation is decreased. This is particularly important when the separation of erythrocytes from whole blood is done to facilitate counting of platelets, where for at least two reasons such fragmentation must be minimized: (1) Each damaged cell can give rise to several fragments which fall within the size range of true platelets; and (2) Because such fragments are smaller than the original erythrocytes for which the matrix is optimized, they will be captured with comparatively low efficiency and so appear in the effluent with the true platelets. Also, in cases where it is desired to separate cells bound to some separable cell or particle, low elutriation forces are essential if the cells and its tagging moiety are to be remain associated.

By way of example, the flow chamber 12 has a cross section of 1.0 cm by 1.0 cm in the plane perpendicular to the local vertical axis 13 and has a length of 1.5 cm along the 45 degree offset flow axis 17. The filter matrix 30 is randomly packed stainless-steel wire AISI 430, 50 micra diameter, filling approximately 10% of the chamber volume. The piezoelectric plate 52 is a KB-Aerotech K-81 transducer element mounted in a sidewall of the flow chamber 12. The plate 52 is epoxied in a hole in the chamber wall 40 and is driven by a voltage applied between its outer surface and the elutriation fluid, which can be isotonic saline. The matrix 30 is in direct contact with the inner surface of the plate 52. A 0.6 cm diameter, 0.2 cm thick lead disc 58, used to back-load the plate 52, is epoxied to the plate 52.

With this configuration, the matrix 30 was magnetized at 1.0 T and dithionite-reduced day-old blood was flowed into the chamber 12. For three capture phases, elutriation was performed as in conventional practice, at about 5 filter-volumes/sec, with zero voltage applied to the plate 52, thereby simulating conventional HGMS operation. Then, for three capture phases elutriation was performed at 2 filter-volumes/sec, i.e. at an elutriation flow rate which was 40% of the prior rate, with a 10 volt peak-to-peak, 60 Hz square wave applied to the plate 52, thereby operatively using the configuration of the present invention. In both cases, average background-corrected separation efficiencies were calculated from data taken with a COULTER COUNTER ® model ZB. The data from "conventional" operation showed 68.1% separation efficiency, and the data from the present invention, when the piezoelectric plate 52 was excited, showed 71.3% separation efficiency. In addition, a COULTER ® CHANNELYZER ® unit was used in conjunction with the ZB counter to determine whether cellular breakup had occurred. The data from the CHANNELYZER unit for conventional elutriation samples showed a decided debris distribution overlying the usual platelet region. When the invention was used, the data from the CHANNELYZER unit showed a markedly smaller distribution in this region. The data from the CHANNELYZER unit is supported by the 3% higher separation efficiency for the invention: Because fewer erythrocytes are damaged by elutriation, more appear to be captured. In further confirmation of the improvement of the invention, elutriation was again performed for three capture phases with the low flow-rate elutriation but without excitation of the piezoelectric plate 52. In this case, the apparent separation efficiency was only 17%, i.e., most of the captured cells were not elutriated by the fluid forces.

Figure 4:
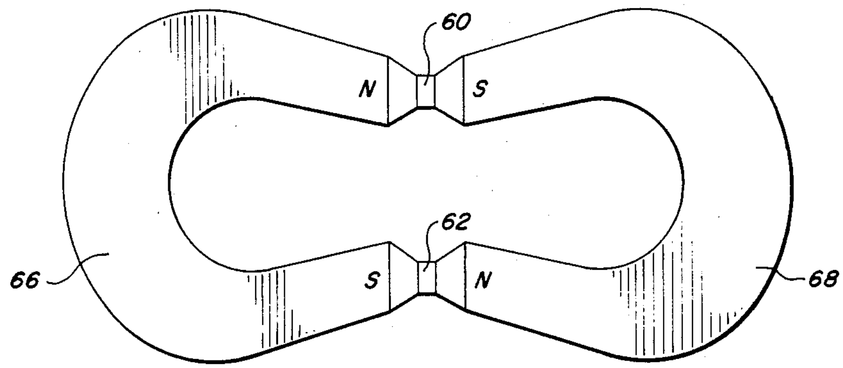
FIG. 4 shows a dual separator embodiment of the present invention.

FIG. 4 shows a top view of an alternate form of the invention including two separators 60 and 62, for example, each having the same form as the separator 10. Two horseshoe or C-shaped permanent magnets 66 and 68 are adapted to provide the magnetic fields used with the separators 60 and 62. This arrangement is particularly easy to implement with readily available magnets. Each of the C-shaped magnets also can be effected by a sequential array of separate magnets, where between adjacent magnets can be another separator, or merely a flux coupler if needed. Moreover, in various forms of this embodiment, either the separator 60 or the separator 62 can be replaced with a high permeability coupling element so that a single separator system can be established.

The invention can be embodied in other specific forms without departing from the spirit or essential characteristics thereof. The present embodiments therefore are to be considered in all respects as illustrative and not restrictive, the scope of the invention being indicated by the appended claims rather than by the foregoing description, and all changes which come within the meaning and range of equivalency of the claims therefore are intended to be embraced therein.

I claim:

1. Separator apparatus for separating fragile magnetic particles from a fluid medium, comprising:

a housing defining a flow chamber having at least one input port and at least one output port, said chamber defining a fluid flow path therethrough from one of said input ports to one of said output ports, a high magnetic permeability, interstitial separation matrix positioned within said flow chamber whereby fluid flowing between said input and output ports passes substantially through interstices in said matrix, magnetizing means for coupling magnetic flux to said matrix, a piezoelectric transducer at least partially within or defining said chamber, said transducer being in fluidic communication with said matrix by way of fluid in said chamber, and selectively operable excitation means for driving said transducer whereby acoustic waves are established in fluid within said chamber.

2. Separator apparatus according to claim 1 wherein said transducer is directly coupled mechanically to said matrix.

3. Separator apparatus according to claim 1 wherein said transducer is spaced apart from said matrix.

4. Separator apparatus according to claim 1 including means for defining said fluid path in said flow chamber and said matrix to extend through said matrix substantially along a fluid flow axis which is offset with respect to a local vertical axis.

5. Separator apparatus according to claim 4 wherein said offset is substantially equal to forty-five degrees.

6. Separator apparatus according to claim 1 wherein said magnetizing means comprises a permanent magnet and associated coupling means for coupling said flux to said matrix.

7. Separator apparatus according to claim 1 wherein said magnetizing means comprises an electromagnet and associated coupling means for coupling said flux to said matrix.

8. Separator apparatus according to claim 7 wherein said magnetizing means further comprises energizing means for selectively energizing said electromagnet.

9. Separator apparatus according to claim 1 wherein said magnetizing means comprises a pair of C-shaped permanent magnets with the North pole of each magnet of said pair being positioned opposite the South pole of the other magnet of said pair thereby providing a first set of oppositely positioned North and South poles, and a second set of oppositely positioned North and South poles, wherein said flow chamber is positioned between said first set of said oppositely positioned North and South poles, and said magnetizing means further comprises coupling means for coupling magnetic flux between said North and South poles of said second set of oppositely positioned North and South poles.

10. Separator apparatus according to claim 9 wherein said coupling means for coupling magnetic flux between said North and South poles of said second set of oppositely positioned North and South poles includes:

a housing defining a flow chamber having at least one input port and at least one output port, said chamber defining a fluid flow path therethrough from one of said input ports to one of said output ports, a high magnetic permeability, interstitial separation matrix positioned within said flow chamber whereby fluid flowing between said input and output ports passes substantially through interstices in said matrix, magnetizing means for coupling magnetic flux to said matrix, a piezoelectric transducer at least partially within or defining said chamber, said transducer being in fluidic communication with said matrix by way of fluid in said chamber, and selectively operable excitation means for driving said transducer whereby acoustic waves are established in fluid within said chamber.

11. Separator apparatus according to claim 1 further comprising means for supporting said housing whereby said one input port is lower than said one output port.

12. Separator apparatus according to claim 1 wherein said piezoelectric transducer is a plate element having two substantially parallel planar surfaces, wherein one of said planar surfaces partially defines said chamber and the other of said planar surfaces is outside said chamber.

13. Separator apparatus according to claim 12 further comprising a back loading element affixed to said other of said planer surfaces of said piezoelectric transducer whereby said chamber and said plate element are substantially quarter wave impedance matched.

* * * * *